United States Patent [19]

Goloff et al.

[11] 4,049,327
[45] Sept. 20, 1977

[54] THRUST BEARING

[75] Inventors: Alexander Goloff, East Peoria; Frank E. Keske, Chillicothe, both of Ill.

[73] Assignee: Caterpillar Tractor Co., Peoria, Ill.

[21] Appl. No.: 628,024

[22] Filed: Nov. 3, 1975

[51] Int. Cl.² ............................................ F16C 32/00
[52] U.S. Cl. .................................. 308/161; 308/135; 308/163
[58] Field of Search ............... 308/219, 2 R, 237, 145, 308/141, 147, 135, 161, 162, DIG. 4, 175

[56] References Cited

U.S. PATENT DOCUMENTS

| 3,941,433 | 3/1976 | Dolling et al. | 308/237 R |
| 3,971,603 | 7/1976 | Bjerk | 308/168 |

Primary Examiner—Richard A. Bertsch
Attorney, Agent, or Firm—Wegner, Stellman, McCord, Wiles & Wood

[57] ABSTRACT

An improved thrust bearing particularly suited for use in applications wherein the bearing is subjected to cocking loads in addition to thrust loads. The bearing includes first and second relatively rotatable members with one of the members including a thrust collar. The other of the members includes a groove receiving the thrust collar and a bearing surface is interposed between the thrust collar and the groove. The groove, collar and bearing surface are constructed and arranged such that a clearance between the parts may vary in the radial direction to promote the maintenance of an oil film of uniform thickness when wobbling or cocking loads are applied.

11 Claims, 9 Drawing Figures

PRIOR ART — NO LOAD
(EXAGGERATED)

PRIOR ART — LOAD
(EXAGGERATED)

LOAD
(EXAGGERATED)

LOAD (EXAGGERATED)

LOAD (EXAGGERATED)

THRUST BEARING

BACKGROUND OF THE INVENTION

This invention relates to thrust bearings, and, more specifically, to thrust bearings employed in applications wherein the bearing components are subject to cocking or wobbling loads as well as thrust loads as, for example, in a slant axis rotary mechanism.

In certain types of mechanisms employing thrust bearings, such as slant axis rotary mechanisms, there is very little room available in which to separate journal bearings for one rotary element a sufficient distance so as to preclude a significant amount of wobble of the journalled element within the bearing clearances. Because, in such mechanisms, loading of the journalled element produces wobble or cocking loads as well as thrust loads, the journalled element will wobble and/or cock with the consequence that detrimental edge loading of the thrust bearings employed will occur. In actuality, clearances between the elements comprising the thrust bearing will approach zero at one point and will be so wide at a point spaced therefrom that the oil film required to prevent wear between the parts will be so thick as to be unable to carry a high load. As a result, the load carrying capacity of a given thrust bearing is substantially diminished, necessitating the of unnecessarily large bearings to provide the desired capacity.

SUMMARY OF THE INVENTION

It is the principal object of the invention to provide a new and improved thrust bearing. More specifically, it is an object of the invention to provide such a thrust bearing particularly suited for use in applications wherein the bearing components are subjected to cocking and wobbling loads as well as thrust loads and wherein an oil film of substantially uniform thickness and of high load carrying capacity is established and maintained between bearing parts during the application of wobbling and/or cocking loads.

An exemplary embodiment of the invention achieves the foregoing objects in a thrust bearing including first and second relatively rotatable members. One of the members is provided with a thrust collar while the other is provided with a groove receiving the thrust collar. Means defining a bearing surface are located at the interface of the thrust collar and the groove. The thrust collar, groove and bearing surface are constructed and arranged such that the clearance between the parts may vary in the radial direction.

In general, the clearance will be greater at the radially outer locations than at radially inner locations and the difference in clearance will be such that, for designed cocking or wobbling loads, substantial parallelism between sliding parts will be maintained to maintain an oil film of substantially uniform thickness and of high load carrying capacity.

In a preferred embodiment of the invention, the bearing surface is defined by a bearing pad interposed between the thrust collar and the groove and the bearing pad has a varying thickness in the radial direction.

In some instances, the bearing pad will be crowned on one side thereof, while in other instances, the bearing pad will be crowned on both sides. In still other instances, the bearing pad will be uncrowned.

When the bearing is employed in a slant axis rotary mechanism, the one rotatable member will comprise a shaft having an angularly offset portion with the thrust collar disposed on the angularly offset portion. The other rotatable member will comprise the rotor of the mechanism.

According to a modified embodiment of the invention, means are provided for flexibly mounting the bearing surface defining means at the interface of the groove and the thrust collar. According to one embodiment, the mounting means comprises a strut carried by one of the rotary members. According to another embodiment of the invention, the mounting means comprises flexible washer means which may be either in the form of an oil resistant elastomer or in the form of a stack of shim-like washers.

Other objects and advantages will become apparent from the following specification taken in connection with the accompanying drawings.

DESCRIPTION OF THE PREFERRED EMBODIMENTS

Figure 1:
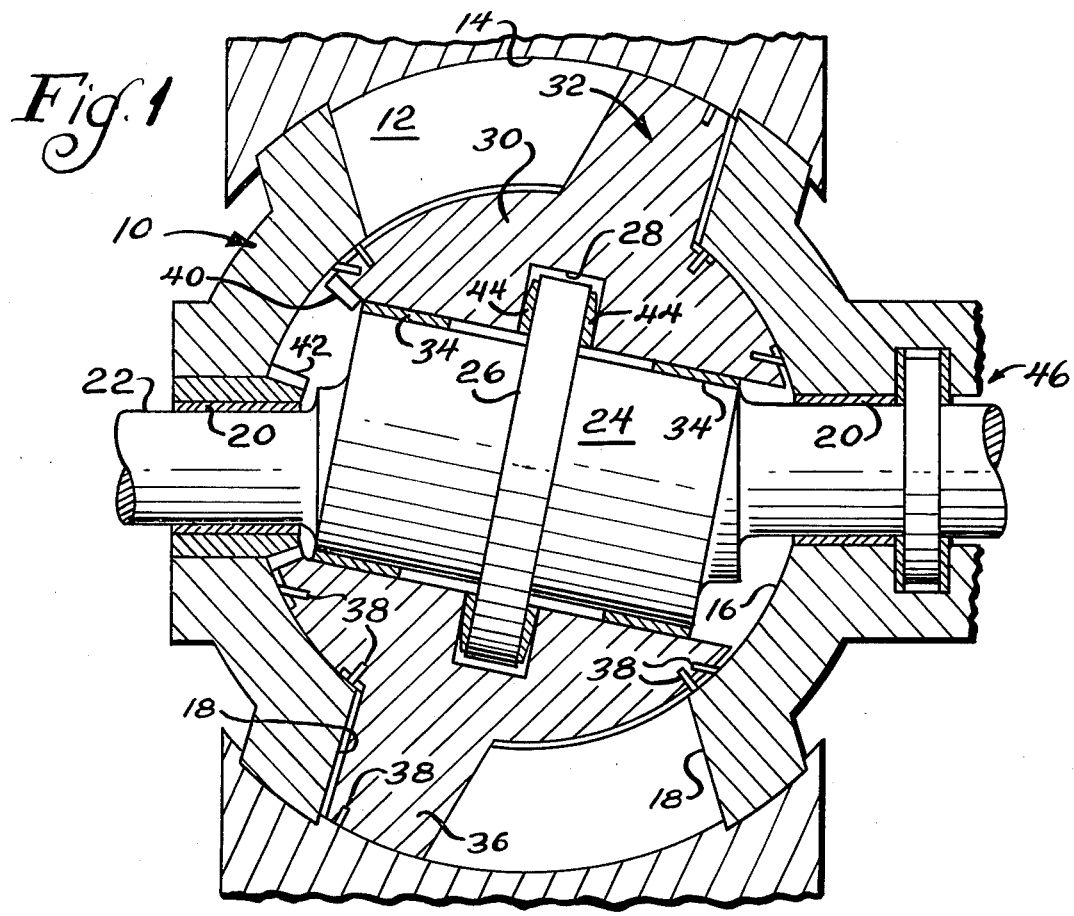
FIG. 1 is a sectional view of a slant axis rotary mechanism utilizing a thrust bearing made according to the invention.

An exemplary embodiment of a thrust bearing made according to the invention is illustrated in the environment of a slant axis rotary mechanism, specifically, a four-cycle, slant axis rotary engine. However, it is to be understood that the inventive thrust bearing may be advantageously employed in other applications, particularly those wherein cocking or wobbling loads are encountered in addition to thrust loads.

The slant axis rotary mechanism includes a housing, generally designated 10, defining a chamber 12, a portion of which acts as an operating cavity as is well known. The chamber 12 is defined by a radially outer spherical wall 14, a radially inner spherical wall 16, and opposed, generally radially extending side walls 18 interconnecting the spherical walls 14 and 16. Bearings 20 journal a shaft 22 in the housing 10. The shaft 22 includes an angularly offset portion 24 disposed within the chamber 12. The angularly offset portion 24 includes a peripheral, radially outwardly extending thrust collar 26.

The thrust collar 26 is received in a groove 28 in the hub 30 of a rotor, generally designated 32. The rotor 32 is journalled on the angularly offset portion 24 of the shaft 22 by journal bearings 34.

The rotor 32 includes a peripheral, radially outwardly extending flange 36 and carries a plurality of seals 38 which sealingly engage various ones of the walls in a conventional fashion. The rotor hub 30 is also provided with an internal ring gear 40 which is meshed with a timing gear 42 carried by the housing to establish the proper timed relation between rotor and shaft movement.

Bearing pads 44 made according to the invention are interposed between the thrust collar 26 and the groove 28.

The slant axis rotary mechanism is completed by a further thrust bearing, generally designated 46, established between the shaft 22 and the housing 10. The thrust bearing 46 is generally subjected to purely thrust loads and, accordingly, may be formed conventionally.

In contrast, the thrust bearing defined by the thrust collar 26, the groove 28 and the bearing pads 44, will be subject to thrust loads and cocking or wobbling loads. As is well known, in a slant axis rotary mechanism employed as an engine, combustion will occur alternately on both sides of the rotor flange 36 at one location in the chamber 12. As a consequence, the forces applied to the flange by combustion will occur to one side of the shaft 22 with the result that loading of the thrust bearing including the thrust collar 26 will be due to both thrust forces and cocking forces.

Figure 2:
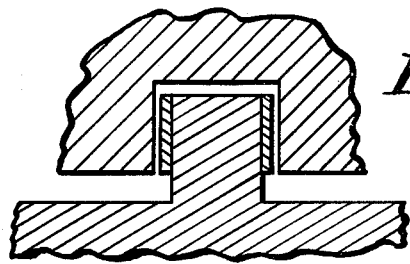
FIG. 2 is a somewhat schematic, fragmentary sectional view of a thrust bearing made according to the prior art under a no-load condition.
Figure 3:
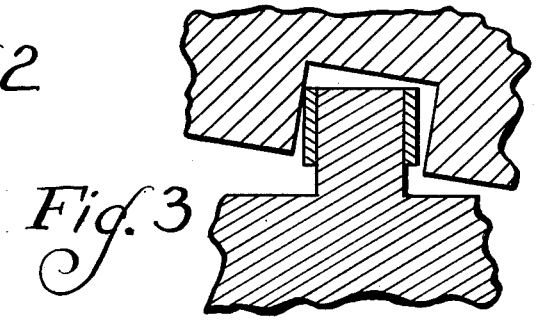
FIG. 3 is a somewhat schematic, fragmentary sectional view of a thrust bearing made according to the prior art under a loaded condition.

In prior art constructions, such a combination of loading forces tends to result in undesirable edge loading of the thrust bearing and/or requires the use of unnecessarily large bearings in order to maintain a given loading capacity. With reference to FIGS. 2 and 3, the problems posed by prior art constructions will be explained in greater detail. FIG. 2 is an exaggerated showing of a prior art thrust bearing under a no-load condition, while FIG. 3 is an exaggerated illustration of the same bearing when loaded. That is, FIG. 3 illustrates the bearing when the rotor is loaded from the left.

In a prior art mechanism of the type illustrated in FIG. 1, the total bearing clearance between the components as illustrated in FIG. 2 will be on the order of 0.076 mm maximum. For illustrative purposes, consider a mechanism wherein the inner diameter of each thrust pad 44 is approximtely 92 mm minimum, while the outer diameter maximum is 138 mm. When the rotor is loaded and wobbles or cocks to the extent permitted by the clearance, the clearance will close down to very nearly zero at the outer diameter, as illustrated in FIG. 3, and will, for the dimensions employed, be on the order of 0.0126 mm at the inner diameter of the bearing pads 44.

In a typical situation, the minimum oil film thickness will often be below 0.0025 mm under maximum loading. As a consequence, a large portion of the sliding surfaces has significantly more clearance than the minimum oil film thickness ranging up to in excess of five times more clearance than the minimum oil film thickness. Such extremely thick oil films are incapable of carrying high loads. Consequently, the bearing must be designed so that maximum loading will be carried by a small portion of the surfaces of the sliding elements.

Figure 4:
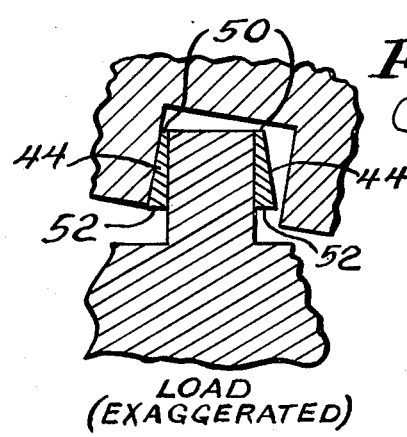
FIG. 4 is a fragmentary, somewhat schematic, sectional view of a thrust bearing made according to the invention under a loaded condition.

One embodiment of the invention avoids the difficulty by varying the thickness of the bearing in the radial direction. More specifically, bearing thickness is greater at the inner diameter of the bearing than at the outer diameter. The difference in thickness may be achieved by appropriately configuring the side walls of the groove 28, the sides of the thrust collar 26 or the cross sectional dimension of the bearing pads 44. FIG. 4 illustrates the latter approach. Specifically, the outer diameter 50 of each bearing pad 44 has a lesser axial width than the inner diameter 52. The difference is chosen to be approximately equal to the clearance that would be present at the inner diameter due to cocking and loading if the bearing was conventionally formed. Thus, for a mechanism having the dimensions set forth above, each pad 44 would have a thickness at its inner diameter 52 of 0.0126 mm greater than its thickness at the outer diameter 50.

As can be seen in FIG. 4, the sliding surfaces of the resulting bearing during loading will be substantially parallel with the consequence that the minimum oil film thickness will be uniformly present from the inner diameter to the outer diameter to maximize load carrying capacity.

In the embodiment illustrated in FIG. 4, the sliding surfaces of the pads 44 are straight. In a usual situation, this configuration will be adequate. However, in applications where some deflection of the parts is encountered, to compensate for such deflection, one or both sides of the pads 44 may be crowned.

Figure 5:
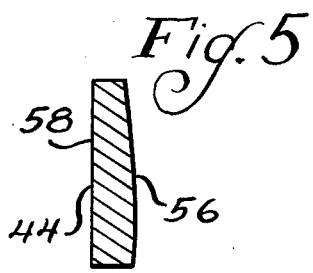
FIG. 5 is a partial sectional view of a thrust bearing pad made according to one embodiment of the invention.
Figure 6:
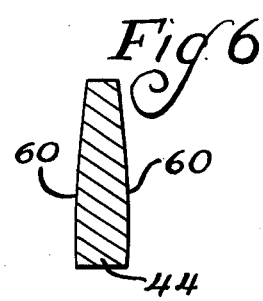
FIG. 6 is a view similar to FIG. 5 of another embodiment of the invention.

FIG. 5 illustrates a pad 44 having a side 56 slightly crowned to compensate for such deflection. The opposite side surface 58 will be the side surface applied to either the rotor or the side of the groove and which will not move relatively to that element.

Where the pads 44 are floating and move relative to both the thrust collar and the sides of the groove, both sides may be crowned, as illustrated at 60, in the embodiment illustrated in FIG. 6.

Variance in bearing clearances to achieve the desired orientation of sliding surfaces with respect to each other to promote a uniform oil film can also be achieved by flexibly mounting the bearing pads. The embodiments illustrated in FIGS. 7-9, inclusive, illustrate this approach.

Figure 7:
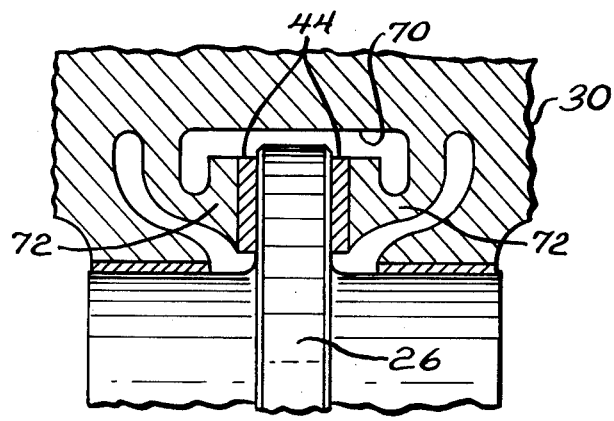
FIG. 7 is a fragmentary, sectional view of still another embodiment of the invention.

Referring to FIG. 7, the rotor hub 30 is provided with a groove 70 for receipt of the thrust collar 26. The groove 70 is configured such that two annular struts 72 face each other therein for receipt of the thrust collar 26 therebetween. Bearing pads 44 are supported by the struts 72.

The struts 72 will be somewhat flexible. As a consequence, when the rotor is loaded, one or the other of the struts 72 will deflect somewhat, allowing the corresponding bearing pad 44 to remain substantially parallel to the face of the thrust collar 26.

Figure 8:
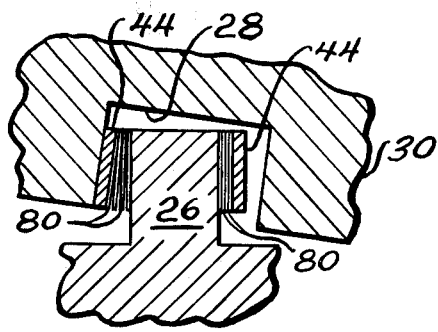
FIG. 8 is a view similar to FIG. 4 of still another embodiment of the invention.

FIG. 8 illustrates still another embodiment of the invention working on the principle of flexibly mounting the bearing pads. Specifically, the bearing pad 44 is secured to the thrust collar 26 via a plurality of nominally flat steel washers 80 which act as a flexible shim pack.

Figure 9:
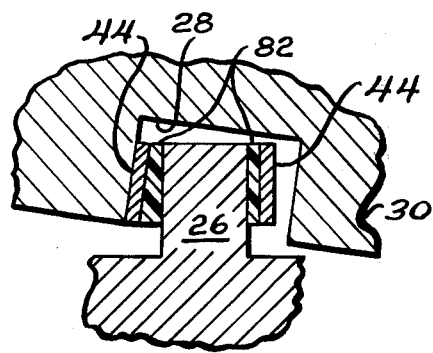
FIG. 9 is a view similar to FIG. 4 of still a further embodiment of the invention.

FIG. 9 illustrates still another embodiment wherein the bearing pad 44 is secured to the thrust collar 26 by a flexible washer 82, preferably formed of an oil resistant elastomer. Typically, the elastomeric washer 82 could be formed of Viton rubber.

What is claimed is:
1. A thrust bearing comprising:
first and second relatively rotatable members;
one of said members including a thrust collar;
the other of said members including a groove receiving said thrust collar; and
means defining a bearing surface at the interface of said thrust collar and said groove;

said collar, groove and bearing surface being constructed and arranged such that clearance between the parts may vary in the radial direction.

2. A thrust bearing according to claim 1 wherein said clearance is greater at radially outer locations than at radially inner locations.

3. A thrust bearing according to claim 1 wherein said bearing surface is defined by a bearing pad interposed between said thrust collar and said groove, said bearing pad having a varying thickness in the radial direction to provide said varying clearance.

4. A thrust bearing according to claim 3 wherein said bearing pad is crowned on one side thereof.

5. A thrust bearing according to claim 3 wherein said bearing pad is crowned on both sides thereof.

6. A slant axis rotary mechanism including the thrust bearing of claim 1 wherein said one member comprises a shaft having an angularly offset portion, said thrust collar being disposed on said angularly offset portion; and said other member comprises a rotor journalled on said angularly offset portion.

7. A thrust bearing according to claim 1 further including means flexibly mounting said bearing surface defning means at said interface.

8. A thrust bearing according to claim 7 wherein said mounting means comprises a strut carried by said other member and partially defining said groove.

9. A thrust bearing according to claim 7 wherein said mounting means comprises flexible washer means.

10. A thrust bearing according to claim 9 wherein said flexible washer means is formed of an oil resistant elastomer.

11. A thrust bearing according to claim 9 wherein said flexible washer means comprises a stack of shim-like washers.

* * * * *